Patented Dec. 9, 1924.

1,518,807

UNITED STATES PATENT OFFICE.

CLARKE C. MINTER, OF NEW YORK, N. Y.

PROCESS IN FROSTING GLASS AND COMPOSITION TO BE USED THEREIN.

No Drawing. Application filed May 27, 1921. Serial No. 473,009.

*To all whom it may concern:*

Be it known that I, CLARKE C. MINTER, a citizen of the United States, residing at New York, in the county of New York and State of New York, have invented certain new and useful Processes in Frosting Glass and Compositions to Be Used Therein, of which the following is a specification.

My invention relates to the frosting of the surface of glass and of articles and objects made of glass—such, for example, as window glass, electric light bulbs, lamp shades, and like articles and objects—to produce ornamental effects or diffusion of light transmitted therethrough.

My invention has among its objects, to produce the effects referred to by a simple and convenient process, requiring but few steps and no expensive apparatus, and to provide a composition as the frosting material or agent which is cheap, readily stored and transported in simple containers and attended by no harmful effects upon the operator in its handling or use.

My invention has also among its objects to provide a composition for and a process of frosting which may be used and performed at ordinary temperatures as distinguished from heating the composition or the article to be frosted as an essential.

My invention contemplates the distribution over the surface of the article to be frosted, of particles of varying degrees of fineness in accordance with the effect to be produced of a substance which in its solid unpowdered state is transparent or translucent to light, and the use of a binding agent to retain the particles referred to in position upon the surface of the glass article to be frosted.

My invention also contemplates a substance as a binding agent which may itself be maintained in liquid form or dissolved in a solvent during the storage, transportation and performance of the frosting process, and in which liquid or solution the particles of the substance producing the frosting effect may be suspended, the liquid or solution thus acting as a carrier, and which liquid or solution, with the particles aforesaid suspended therein, when spread upon the surface of the article to be frosted, will in contact with the air, be reduced to a transparent film having the property of tenacious adherence to the surface of the article, and in which film the particles of the substance producing the frosting effect are imbedded and distributed over the surface of the article.

The above stated, and other objects and principles of my invention will appear from a detailed description later to be given of a preferred composition and specific examples of a process of frosting illustrating my invention, but it is to be understood that the preferred composition and the specific examples of the process are merely illustrative of my invention, and that my invention is not to be limited thereto.

I employ as the film-forming and binding agent and carrier for the particles of the substance producing the frosting effect, a water soluble silicate such as the alkali salts of silicic acid, and preferably sodium silicate.

I preferably employ for the substance to produce the frosting effect finely divided or powdered glass, although any other glass-like, vitreous, siliceous, or other substance having the qualities heretofore mentioned may be used.

The preferred composition is produced by forming a water solution of sodium silicate and adding thereto the finely divided or powdered glass in proportion to constitute a solution of the sodium silicate and water with the particles of glass suspended therethrough in such quantities that when the article to be frosted is dipped therein or the solution is poured over the article to be frosted, as hereinafter set forth, an even spread of a film of the solution with the particles of glass distributed therethrough will be deposited on the article.

The silicate may be added to the water up to the saturation point, the closer the saturation point is approached, the quicker the transformation of the liquid into a solid permanent film. If a substantially less proportion of the silicate is used, however, so as to produce a distinctly dilute solution, some hydrolysis of the salt occurs, which is preferably avoided as the sodium hydroxide of the hydrolization reacts somewhat with the powdered glass. This reaction may be avoided by increasing the proportion of sodium silicate or by adding a small quantity of sodium hydroxide to shift the hydrolysis equilibrium and cause a reformation of sodium silicate in the solution in a well known manner, or by both methods. In practice, it has been found preferable to produce a solution somewhat under the saturation point to avoid over-saturation by evaporation of the water during storage or use, or too rap'd formation of the film, and to add a small quantity of sodium hydroxide to the mixture.

I have found a composition satisfactory for general frosting purposes to consist of three pounds of sodium silicate, one-eighth pound of sodium hydroxide and five and one half pounds of powdered glass to every gallon of water, although it is to be understood that the proportions of all these components may vary under the controlling principles heretofore stated, and for special uses of quick or slow formation of the film and a thick or more attenuated distribution of the particles of glass over the surface of the article to be frosted.

The composition thus formed is preferably kept in air tight containers such as a tin container with a properly sealed cover, for storage and shipment to the place of use.

The practice of the process comprised in my invention may vary in accordance with the size and formation of the article to be frosted.

One manner of such practice is to fill an open vat with the composition formed as above comprising the carrier solution with the particles of the finely divided or powdered glass suspended therein. The article to be frosted is then dipped therein to produce a film of the solution over the surface to be frosted and with the fine particles of glass disseminated therethrough and hence spread over the surface of the article.

The article is then placed aside to await the formation from the solution of a solid permanent film.

In the formation of such a film, where the solution used is a silicate of the character herein set forth, apparently the carbon dioxide of the atmosphere displaces the silicic acid from the salt, forming a carbonate, sodium carbonate in the specific example here given, and the liberated silicic acid appears to be the film forming substance, the excess water evaporating and a hard transparent water insoluble and permanent film being formed, tenaciously adhering to the surface of the article it coats, and binding thereto the imbedded fine particles of the glass in the composition used, such fine particles of glass thus being permanently held in position distributed over the surface of the coated article and producing the desired diffusion of the light transmitted through the article coated.

After the formation of the film as stated, the article thus coated is washed to remove any residue of sodium carbonate, sodium silicate or other compounds exposed on the surface of the film.

As the article thus frosted continues in use, the hardness and permanency of the frosting appears to be increased rather than diminished, due apparently to a dehydration of the silicic acid and the formation of silicon dioxide and insoluble hydrates which become more permanently bound to the glass surfaces by a reactance with the glass along their contacting portions. In any event, whatever the chemical principles and reactions involved, a permanent coating in the form of a frosting remains.

Where hollow articles are to be frosted upon their inside surfaces, such as bowls or bulbs for electric lighting, the composition may be poured therein, shaken about to evenly distribute the film, and the excess poured out.

Or the composition may be poured over the surface of the article to be frosted instead of the article dipped therein.

The composition is also of such a character as to enable the coating to be made by so simple a process as dipping an ordinary brush of the type of a paint brush therein and passing the brush over the surface of the article to be coated in substantially the same manner as in ordinary painting. This is of particular value in the frosting of window panes and like articles in position in use.

In fact the composition displays a certain analogy to the composition of a can of prepared and ready-for-use paint to the extent that the solid finely divided particles depended upon to produce the coating effect are suspended throughout a liquid carrier; and in the same way that it is desirable in use to stir the paint mixture to produce a uniform dissemination of the solid particles it may be desirable to stir the present composition to produce a uniform dissemination of the particles of glass.

As already stated, my invention is particularly directed to the use of a soluble salt of silicic acid as the agent for carrying the finely divided or powdered glass or other like substance in suspension, and for forming a film binding those fine particles in distributed positions over the glass article to be frosted, and such an agent, and especially the sodium salt, is of particular applicability because of its cheapness and because of the permanent and tenacious character of the film ultimately formed.

Other carrying and film forming agents however may be used, such for example as pyroxyline dissolved in the usual volatile solvents therefor; or a quickly drying and transparent film forming substance such as linseed oil with the usual volatile liquids used therewith.

Having particularly described my invention, what I claim and desire to secure by Letters Patent is:

1. A composition for forming a substantially colorless translucent frosting upon glass consisting of a water soluble silicate, water, and glass in finely divided particles.

2. A composition for forming a substantially colorless translucent frosting upon glass consisting of a mixture of sodium silicate, water, and glass in finely divided particles.

3. A composition for forming a substantially colorless translucent frosting upon glass comprising an incompletely saturated water solution of a silicate and glass in finely divided particles.

4. A process of frosting glass articles comprising directing a water soluble silicate having suspended thereon finely divided particles of glass across the surface to be frosted to entirely cover said surface to be frosted with a film of said solution having disseminated therethrough said particles of glass or the like, exposing said glass article to contact of said film of said solution with the air to cause the formation of a solid film from said solution, and after the formation of said solid film washing said surface with water to remove any water soluble residue.

5. A process of frosting glass articles comprising dipping the article to be frosted into a water solution of a silicate having suspended therein finely divided particles of glass to cause a film of said solution having said particles of glass or the like disseminated therethrough to adhere to the surface to be frosted, withdrawing said article from said solution and exposing said article to the air to cause the formation of a solid film from said solution, and after the formation of said solid film washing said surface with water to remove any water soluble residue.

In testimony that I claim the foregoing, I have hereunto set my hand this 26th day of May, 1921.

CLARKE C. MINTER.